US005153615A

United States Patent [19]

Snelling

[11] Patent Number: 5,153,615

[45] Date of Patent: Oct. 6, 1992

[54] PYROELECTRIC DIRECT MARKING METHOD AND APPARATUS

[75] Inventor: Christopher Snelling, Penfield, N.Y.

[73] Assignee: Xerox Corporation, Stamford, Conn.

[21] Appl. No.: 691,775

[22] Filed: Apr. 26, 1991

[51] Int. Cl.[5] .......... G01D 15/06

[52] U.S. Cl. .......... 346/153.1; 346/1.1; 346/76 R; 346/76 PH

[58] Field of Search .......... 346/153.1, 76 R, 76 PH, 346/1.1

[56] References Cited

U.S. PATENT DOCUMENTS

| | | | |
|---|---|---|---|
| Re. 33,525 | 1/1991 | Kohashi | 346/76 PH |
| 3,713,822 | 1/1973 | Kiess | 430/87 |
| 3,824,098 | 7/1974 | Bergman et al. | 430/87 |
| 3,899,969 | 8/1975 | Taylor | 101/130 |
| 3,935,327 | 1/1976 | Taylor | 427/19 |
| 4,103,066 | 7/1978 | Brooks et al. | 428/337 |
| 4,357,618 | 11/1982 | Ragland | 346/159 |
| 4,514,744 | 4/1985 | Saitoh et al. | 346/153.1 |
| 4,746,939 | 5/1988 | Kikuchi et al. | 346/153.1 |
| 4,797,689 | 1/1989 | Nanai | 346/76 PH |
| 5,049,905 | 9/1991 | Tomoyori et al. | 346/153.1 |

FOREIGN PATENT DOCUMENTS

| | | |
|---|---|---|
| 60-104965 | 6/1985 | Japan . |
| 2-157864 | 6/1990 | Japan . |

OTHER PUBLICATIONS

J. G. Bergman et al., "Pyroelectric Copying Process," *Applied Physics, Letters,* vol. 21, No. 10, pp. 497–499, Nov. 15, 1972.

Joseph M. Crowley, "Fundamentals of Applied Electrostatics," pp. 137–145, 1986, Wiley & Sons, New York.

Keith S. Pennington et al., "Resistive Ribbon Printing: How It's Done," *Annual Guide to Ribbons & Toner,* pp. 54–62, 1986.

D. Dove et al., "High Resolution Resistive Ribbon Printing for Typesetter Application," *Journal of Imaging Science,* vol. 33, No. 1, pp. 7–10, Jan./Feb. 1989.

*Primary Examiner*—Benjamin R. Fuller
*Assistant Examiner*—Randy W. Gibson
*Attorney, Agent, or Firm*—Duane C. Basch

[57] ABSTRACT

A method and apparatus for printing including the use of a pyroelectric material in a novel fashion to directly mark an image on a print substrate. The image is produced by initially coating a poled pyroelectric material with a uniform coating of charged marking particles and subsequently thermally exposing the pyroelectric material in a localized fashion, thus reversing the polarity of the charge which repels the particles from the surface of the pyroelectric material, and in the direction of the surface of a print substrate placed in close proximity thereto. Subsequently, the image formed by the transferred marking particles is fixed to the substrate by a thermal or other well known fusing treatment.

17 Claims, 3 Drawing Sheets

PYROELECTRIC DIRECT MARKING METHOD AND APPARATUS

Cross reference is hereby made to commonly assigned, copending patent application entitled "PYROELECTRIC IMAGING METHOD AND APPARATUS" submitted by Christopher Snelling application Ser. No. 07/691,774, filed Apr. 26, 1991, the relevant portions of which are hereby incorporated by reference in the present application.

This invention relates generally to a printing apparatus utilizing a pyroelectric marking device, and more particularly to an apparatus which utilizes a pyroelectric donor in a novel manner to selectively transfer charged toner particles to a substrate, thereby producing a printed image.

In the past, polyvinylidene fluoride (PVDF) film and other materials have been known to exhibit pyroelectric effects. For example, it is known that the PVDF films may be heated to induce the formation of an electrostatic charge on the surface of the film. In addition, polarization of the film, where the majority of the dipole moments are permanently aligned, increases the magnitude of the pyroelectric behavior for such films. Alternatively, other materials such as triglycine sulfate (TGS) may be used to produce the electrostatic charge in response to a change in temperature, as described by Crowley in "Fundamentals of Applied Electrostatics" (Wiley & Sons, New York, 1986, pp. 137–145).

For example, U.S. Pat. No. 3,824,098 to Bergman et al. teaches an electrostatic copying device having a polymeric polyvinylidene fluoride film as a medium for producing a patterned electrostatic charge. The patterned electrostatic charge is produced by exposing the film to the image of an object interposed between the film and a light source. The radiant energy of the light source being sufficient to cause electrostatic charge of sufficient resolution to enable the charge pattern to be developed by toning the charged film with electrostatically charged inks. Also disclosed by Bergman et al. in Applied Physics Letters, Vol. 21, No. 10, pp. 497–499, Nov. 15, 1972 is a system capable of producing negative images by neutralizing the pyroelectric element subsequent to projecting the image on the pyroelectric material, and then allowing the material to cool down. This resulted in a reversal of the sign of the electrostatic charge produced on the surface of the pyroelectric material.

In a copying system, a uniformly poled pyroelectric material may be selectively heated to form a differential charge pattern which can subsequently be developed. For example, U.S. Pat. No. 3,899,969 to Taylor teaches a method for printing using a pyroelectric material having dipoles that are permanently poled to form a permanent pattern corresponding to a graphic representation. Subsequently, the permanently poled material can be used by heating or cooling to produce a charge pattern representative of the graphic representation, which can then be developed with toner powder, transferred to a sheet of paper, and fused to form a printed page. The heating, toning and fusing process may be repeated, thereby producing multiple copies. In a similar embodiment, U.S. Pat. No. 3,935,327 to Taylor discloses a method for copying a graphic representation using a uniformly poled pyroelectric material. The material is selectively heated to form a differential charge pattern on the material that can be developed with charged toner particles to form a copy of the graphic representation.

Moreover, Japanese Patent No. 60-104965 to Sakai teaches a thermal recording device using a pyroelectric material such as vinylidene polyfluoride. The device moves the pyroelectric material past a heat-sensitive head which forms a latent image thereon. The latent image is developed with toner and the developed image is then transferred to paper with the aid of a positively charged transfer member. The paper is then passed between a pair of heated fixing rollers.

Finally, Japanese Patent No. 63-312050 to Okuyama discloses a recorder having an electrostatic latent image carrier with a pyroelectric layer of polyvinylidene fluoride. Electrical current is passed through a heating element in response to an external recording signal. The heat generated by the heating element is transferred to the pyroelectric material, causing the formation of an electrostatic latent image which may be developed by conventional methods. Furthermore, the electrical energy may be modulated to readily form an electrostatic latent image of half tone.

In general the aforementioned references do not address the use of a pyroelectric material in a direct marking application, where the image is applied directly to a substrate material. The advantages of such direct marking systems, over typical xerographic marking systems, are manifest in the elimination of intermediate steps where a latent image would be developed and then subsequently transferred to the substrate. Further advantages result from the relatively simple apparatus which is required to use a pyroelectric donor for direct marking. These include the ability to create toner images on plain paper and the elimination of high voltage (corona) power supplies which are generally used in electrostatic printing systems. Hence, a system using a pyroelectric material in a direct marking application would not only be less expensive when compared to a similar electrostatic printing machine, but would be capable of producing the same, albeit less expensive, plain paper output.

From the foregoing discussion, one can easily see that it would be extremely valuable to be able to produce a printing or copying system utilizing a pyroelectric donor for direct marking on a substrate with charged toner particles. Such a system would reduce the need for high power circuits typically found in the charging and transfer systems of most xerographic printing machines. Moreover, the pyroelectric marking system may be produced using available thermal print head technology, or other high-resolution, addressable thermal output devices. For example, use of a pyroelectric marking apparatus would enable the use of existing thermal print head technology in low cost plain paper printing and copying systems. Furthermore, a pyroelectric donor material may be used in conjunction with a resistive ribbon substrate in the same manner to produce a similarly inexpensive direct marking device.

Accordingly, and in accordance with the present invention, a method and apparatus for printing is disclosed which includes the use of a pyroelectric material in a novel fashion to directly mark an image on a print substrate. The prints are produced by initially coating a poled pyroelectric material with a uniform coating of charged marking or toner particles and subsequently thermally exposing the pyroelectric material in a localized fashion, thus reversing the polarity of the charge in localized regions on the surface of the pyroelectric material. Upon reversing the polarity of the charge, the charged marking particles are repelled from the surface of the pyroelectric material and are attracted to the surface of a print substrate placed in close proximity thereto. Subsequently, the image formed by the transferred marking particles is fixed to the substrate by a thermal or other well known fusing treatment.

Other advantages of the present invention will become apparent after studying the following description taken in conjunction with the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
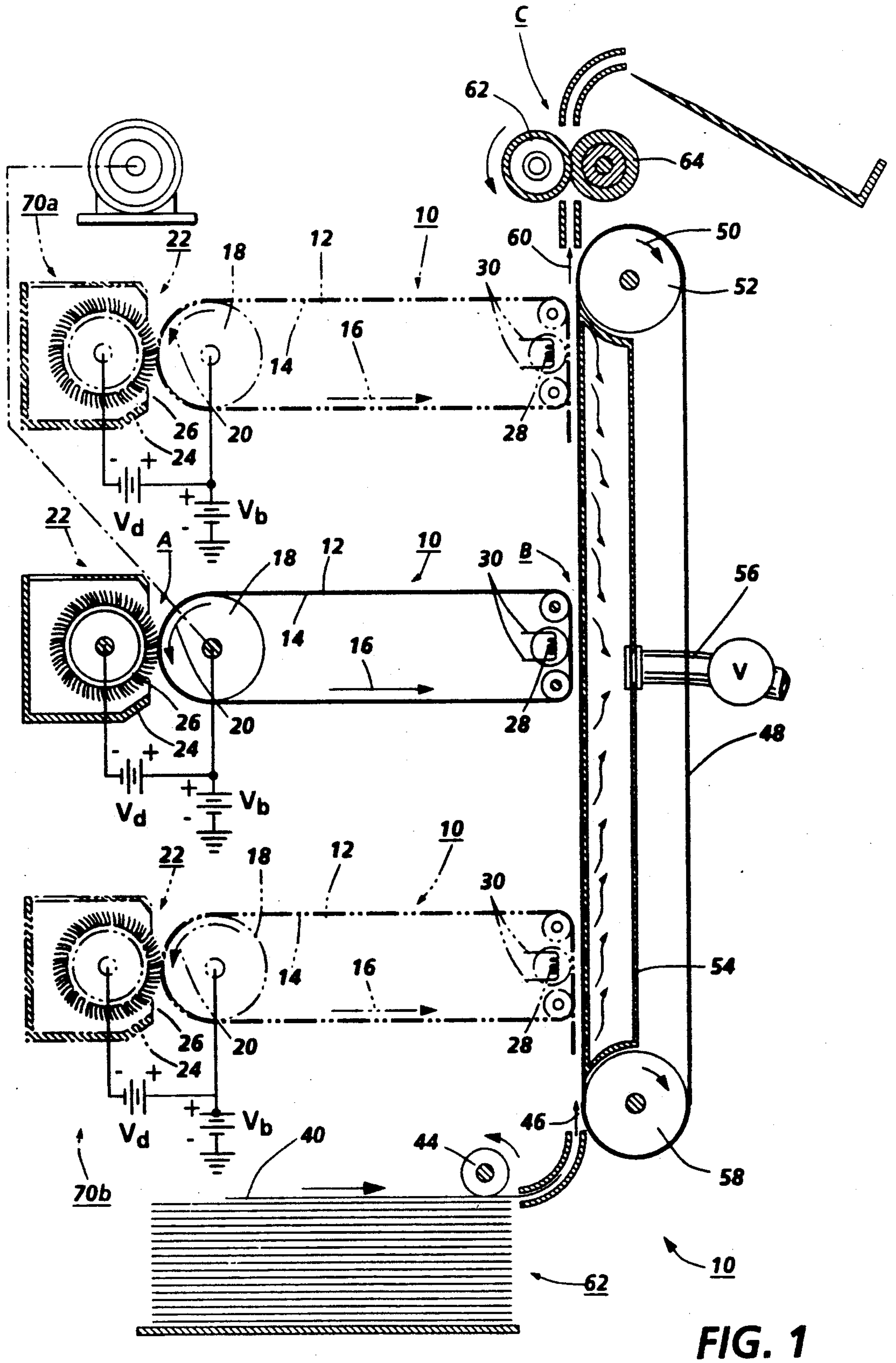
FIG. 1 is a schematic elevational view of a printing machine incorporating the present invention.

For a general understanding of a printing machine in which the features of the present invention may be incorporated, reference is made to FIG. 1, which schematically depicts the various components thereof. Although the apparatus for directly marking the copy sheets is particularly well adapted for use in the machine of FIG. 1, it should be evident from the following discussion that it is equally well suited for use in a wide variety of printing, duplicating and facsimile devices.

In the printing machine of FIG. 1, a donor belt 10 having a pyroelectrically responsive outer layer 12 and a conductive base layer 14, is rotated in the direction indicated by arrow 16 through various processing stations by drive roll 18. Initially, roll 18 is rotated in the direction of arrow 20 to move belt 10 through donor loading station A. Loading station A employs a developer unit, indicated generally by reference numeral 22, having developer housing 24 for maintaining a supply of development material therein. The developer material generally comprises magnetic carrier granules with charged toner particles adhering triboelectrically thereto. Developer unit 22 is preferably a magnetic brush development system where the developer material is moved through a magnetic flux field causing a brush 26 to form. The surface of pyroelectric layer 12 is toned by bringing the layer into contact with a biased magnetic brush, brush 26. The brush is biased as indicated by a direct current potential $V_d$, referred to as the donor loading voltage. Donor loading voltage $V_d$ may applied via a conductive drive roll, drive roll 18, or other suitable commutative method in contact with conductive base layer 14 of belt 10. In this manner, the toner particles on magnetic brush 26 are electrostatically attracted to belt 10, thereby forming a uniform toner layer on the surface of layer 12.

As an alternative to the aforedescribed dry development system, a liquid development system may be employed to provide a uniform layer of marking particles on the surface of belt 10. Such a system would require a liquid transfer medium which would allow the migration of the charged marking particles to the surface of donor belt 10. However, it is believed that such a system would need to be placed in close proximity to marking station B to enable uniform toning of the donor immediately prior to the marking operation. Moreover, marking station B would also require the use of a liquid in the interfacial region between donor belt 10 and receiving sheet 40, to facilitate the migration of the charged marking particles from the donor to the sheet.

Belt 10, having been previously coated with a layer of charged toner particles, is rotated in the direction of arrow 16 to move the toner covered surface thereon to marking station B. Coincident with the rotation of belt 10, a copy sheet is advanced to marking station B. In operation, copy sheet 40 is advanced from stack 42 and fed into position, so as to register and maintain the sheet in close proximity to the surface of donor belt 10. Generally, sheet 40 is advanced by feed roll 44, towards marking station B in a direction generally indicated by arrow 46. Copy sheet 40, which may be any suitable image receiving substrate, is fed and deskewed by feed roll 44 until sufficiently engaged by vacuum transport belt 48, which is driven by drive roll 50 rotating in a direction indicated by arrow 52. Engagement of copy sheet 40 by vacuum transport belt 48 is accomplished by the negative pressure produced by vacuum plenum 54. Vacuum plenum 54 is maintained at a slightly negative pressure by a vacuum pump (illustrated schematically as V), connected via vacuum hose 56. Vacuum transport belt 48 is supported during rotation by drive roll 50 and idler roll 58, as it passes over the surface of plenum 54. Upon reaching marking station B, under the control of vacuum transport belt 48, sheet 40 is ready for the selective transfer of toner from donor belt 10 to the adjacent surface of the sheet.

The selective transfer of toner particles from the surface of belt 10 to sheet 40 is accomplished through the use of thermal print stylus 28, which selectively heats conductive base layer 14 of belt 10. Heating thermally conductive base layer 14 results in the rapid or instantaneous heating of pyroelectric layer 12 thereby resulting in localized heating of the pyroelectric layer. Thermal coupling between belt 10 and stylus 28 is assured by maintaining the stylus in close proximity or contact with the rear of belt 10. In response to the thermal activation of layers 14 and 12, by thermal print stylus 18, pyroelectric layer 12 generates an opposite polarity electrostatic charge on the surface thereof.

Thermal print stylus 28 is an array typically used for the production of prints on thermally sensitive paper. For example, the thermal array (Part No. FFPXA07132, Part Name: HEAD) used in the "Panasonic Apogee/1 (FN-P300)" desktop digital copier has been shown to be suitable for producing the temperature increase necessary to illustrate the pyroelectric effect of layer 12. Alternatively, thermal activation of pyroelectric layer 12 may be accomplished with a plurality of "hot-wire" styli, for example 0.002" tungsten wires, which would be held in contact with conductive layer 14 of belt 10 to enable conduction of the localized thermal input to layer 12. Another alternative is a film type thermal print head. For example, the "KF Series-Thick Film Thermal Print Heads" from Rohm Co., Ltd. appear to be suitable for producing the required heat transfer necessary in the present invention. The individual thermal elements of stylus 28 are driven by an electronic subsystem (ESS) (not shown), via input lines 30, in accordance with imaginal data received from either a print source (not shown) or from a commonly known charge coupled device (CCD) (not shown). The print source may be any suitable raster input generation system. Likewise, the CCD may be any well known raster input device capable of generating a rasterized representation of an image contained on an original document. Generally, the output of the individual sensors of the CCD are transferred to the ESS for output to thermal stylus 28. The ESS may also act as an image processing device, capable of correcting and/or modifying the input data in accordance with a set of predefined requirements.

Thereafter, belt 10 continues to be rotated by drive roll 36, to return the region of the belt which was most recently used as a donor of marking particles to toner loading station A for replenishment of toner in the depleted regions, thereby reestablishing the uniform toner layer on the surface of belt 10. While traveling back to station A, the selectively heated regions of the belt are allowed to cool, thereby returning to the charge on the surface of pyroelectric layer 12 to its original polarity, thereby enabling the replenishment of the depleted regions with more charged toner particles.

Coincident with the continued rotation of belt 10, vacuum belt 48 continues to rotate, thereby moving the remainder of sheet 40 through marking station B to continue the transfer of the image over the remainder of the sheet. Subsequently, the sheet travels beyond the end of vacuum plenum 54 and is stripped from vacuum transport belt 48 by, for example, the beam strength of the sheet. Next, copy sheet 40 is advanced in the direction of arrow 60, having the transferred toner image areas thereon, to fusing station C where the toner image is fixed to the surface of the copy sheet. Fusing station C may be any commonly known apparatus for fixing toner particles to the surface of a substrate. For example, FIG. 1 illustrates a heated pressure roll fusing system having heated fuser roll 62 and pressure roll 64 forming a nip therebetween. Advancing copy sheet 40 is engaged by the fuser roll nip, and the toner image on the surface of the sheet is fused to the sheet as it passes through the region of increased temperature and pressure present within the nip.

As further illustrated in FIG. 1, the aforedescribed marking apparatus may be replicated in one or more additional positions along the path of copy sheet 40, as indicated by reference numerals 70*a*, *b*. Replication of the marking apparatus would enable the use of alternate or additional printing colors through utilization of various colored toner materials. Furthermore, use of the vacuum transport system as disclosed would enable the highly accurate registration required for single-pass, multi-color printing or reprographic systems.

Figure 2:
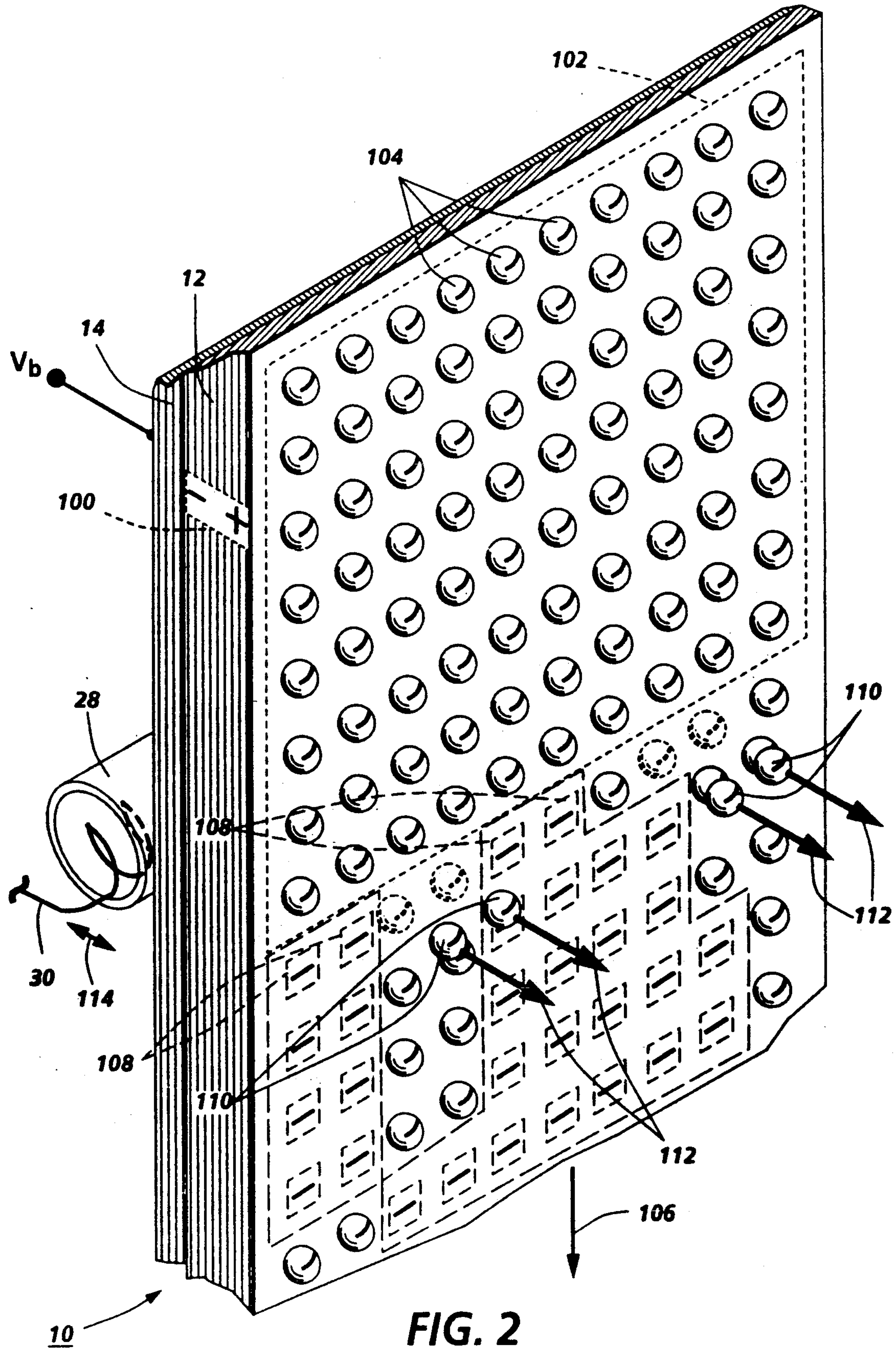
FIG. 2 is an enlarged representation of a portion of the thermal print head and pyroelectric member of FIG. 1.

Referring now to FIG. 2, wherein the thermal print head and pyroelectric belt of marking station B are illustrated schematically in an enlarged fashion, belt 10 is depicted as having a permanently poled pyroelectric layer 12, and bias voltage $V_b$ applied to conductive base layer 14, resulting in the charge dipole orientation illustrated by reference numeral 100, producing a net electric field between conductive base layer 14 and the surface of the copy sheet. Having the indicated charge dipole, the positively charged surface of layer 12, indicated generally as area 102, would naturally attract negatively charged toner particles 104. As illustrated, area 102 has been previously toned at toner loading station A, and is presently entering marking station B in the process direction indicated by arrow 106.

At marking station B, conductive surface 14 of belt 10 is placed in contact with, or in close proximity to, thermal print stylus 28, enabling the localized conduction of thermal energy from the stylus to pyroelectric layer 12, via conductive layer 14. The localized heating of layer 12, results in a reversal of the polarity of the charge on the surface, as indicated by a net negative charge at locations 108. The localized negative charge potential on surface 12 effectively repels toner particles 110 from the surface in a direction indicated by arrows 112. As previously indicated, those particles repelled from the surface of belt 10 are transferred to the surface of copy sheet 40 of FIG. 1. The transfer or marking process may be enhanced by applying vibrational or acoustic motion to the rear of belt 10. For example, thermal pring stylus 28 may be vibrated in the direction indicated by arrows 114 to effectively reduce the electrical field force required for release of the toner from the surface of layer 12.

Figure 3:
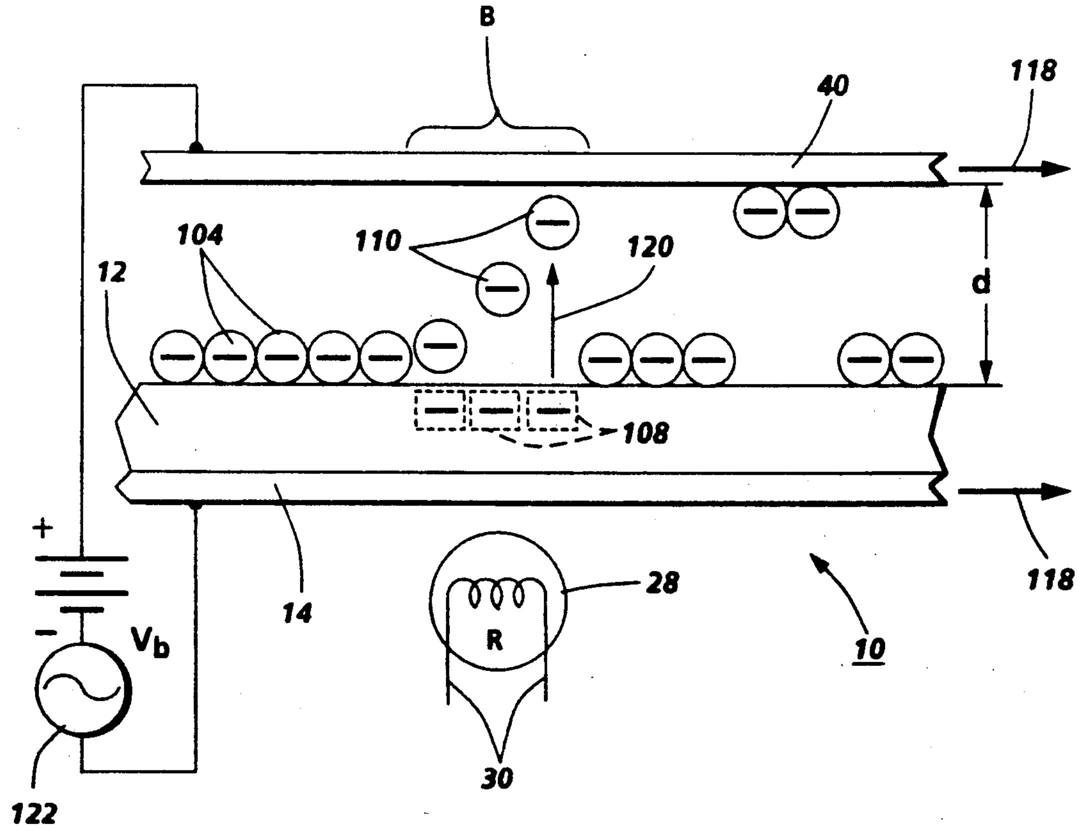
FIG. 3 is a schematic illustration of the pyroelectric transfer process of the present invention.

Referring also to FIG. 3, which further illustrates the pyroelectric transfer process as belt 10 and copy sheet 40 proceed through marking station B, toner particles 104 are selectively transferred from the surface of layer 12, to the surface of sheet 40 as the donor belt and copy sheet move in registration in the process direction indicated by arrows 118. The pyroelectric material forming layer 12 is a polymer material based polyvinylidene fluoride (PVDF) which is used as the base resin for the "KYNAR PIEZO FILM" manufactured by Atochem North America, (formerly Pennwalt Corporation). The pyroelectric coefficient ($K_{py}$) of the material is in the range of 2.3–2.7 nC/cm$^2$°K. Accordingly, the temperature change required to produce a charge density ($\Delta P_{se}$) suitable for repelling the charged toner particles from the surface of pyroelectric layer 12 is determined as a function of the pyroelectric coefficient of the PVDF film. The required temperature change is in the range of about 10° to 50° K. (18° to 90° F.), to produce a potential on the surface of a 100$\mu$ PVDF film suitable to repel a toner particle across a 250$\mu$ (approximately 0.010 in.) gap. It should be noted that suitable repelling forces may be generated with both larger and smaller temperature changes, and that the potential required is primarily a function of the force required to repel the toner particles from the charged surface which may be altered by the addition of vibrational energy. Therefore, use of a thermal print head capable of producing localized temperature changes in excess of 70° C. would appear to be acceptable, and may in fact increase the latitude of the process by enabling a wider range of development materials to be used. Furthermore, commonly known thermal print head designs would appear to be well suited for use in the exposure station of the present invention.

Thermal print stylus 28 has a plurality of internal resistive elements, each being driven by an externally controlled current source (not shown). For explanation purposes, a single resistive element 74 is shown in FIG. 3, wherein the element is activated via lines 30, however, in practice a series of these elements are placed in a linear array extending across the width of the paper path.

In an alternative embodiment, the thermal energy may be applied to pyroelectric layer 12, via a resistive ribbon material incorporated into belt 10 as layer 14. Such a resistive ribbon is generally well known, providing localized thermal activation via controlled current flow. For example, Belt 10 may have the characteristics of a resistive ribbon structure as described by Pennington et al. in "Resistive Ribbon Printing: How It's Done," *Annual Guide to Ribbons & Toner,* 1986, Dove et al. in "High Resolution Resistive Ribbon Printing for Typesetter Application," Journal of Imaging Science, Volume 33, No. 1, Jan./Feb. 1989, and by Brooks et al. in U.S. Pat. No. 4,103,066, the relevant portions of these references being hereby incorporated by reference. Generally, the resistive ribbon structure would underlie pyroelectric layer 12, and would replace layer 14 as illustrated in the drawings. In this alternative embodiment, a belt or ribbon may be coated with toner, and subsequent marking would occur by applying current to selected resistive regions via conductive electrode contacts or commutators.

Specifically, this alternative embodiment would employ a resistive ribbon substrate layer (not shown) beneath pyroelectric layer 12, so that the resistive ribbon substrate, upon activation by point contact electrodes (not shown), would produce the necessary localized heating of the substrate and adjacent pyroelectric layer 12. Such a structure would generally employ a pyroelectric top layer equivalent to layer 12, an underlying metallic inter-layer, and an electrically conductive substrate layer on the bottom. Application of high current density to the underside of belt 10, via pin-type print head electrodes, would result in highly localized heating within the metallic inter-layer above the electrodes and, thus, the simultaneous localized heating of the pyroelectric layer. Generally, the print head electrodes would be driven in a manner similar to the individual elements of stylus 28, by a rasterized image data source. This embodiment would enable higher process speeds and improved image resolution as there would be much less loss of thermal energy as compared to the contact type thermal print stylus. The localized heating of the pyroelectric top layer would result, as previously described, in localized electrostatic charge patterns on the surface of the pyroelectric layer. The resultant potential would repel the charged toner particles away from the surface of belt 10.

The advantage of this alternative embodiment is that the thermal activation means is a direct component of donor belt 10, and therefore moves with the belt. In addition, such a system would have increased image resolution of up to approximately 1000 spots/inch, and potentially an increase in the process speed.

Continuing now with the general description, upon heating pyroelectric layer 12, negative net surface charge 108 results on the surface of layer 12. Deposition of toner particles 104 onto the surface of a receiving substrate, paper sheet 40, occurs when the net force on the toner particles is in the direction indicated by arrow 120. The magnitude of the electric field ($E_n$) within the gap between paper sheet 40, and pyroelectric layer 12, is a function of the effective voltage differential and distance between the two surfaces. In general, $E_n$ is represented by the following equation:

$$E_n=(V_b+V_{image})/V_d,$$

where $V_b$ represents the bias voltage applied to the two surfaces via conductive layer 14, and a conductive member, such as a grid or screen, that would be incorporated within vacuum plenum 54 of FIG. 2. Furthermore, $V_{image}$ represents the effective change in local surface potential due to localized heating of the pyroelectric layer. In addition, the distance between the two surfaces is represented by d. As previously stated, vibrational energy may be applied to donor belt 10 to assist in the separation of the toner particles. An acoustical vibration force, applied via thermal print stylus 28, would serve to effectively decrease the magnitude of the electric field required to dislodge the toner by imparting vibrational energy to the particles, in the direction of arrow 120.

Alternatively, the vibrational energy may be supplied to the toner particles using the piezoelectric characteristics of the PVDF film. Addition of an alternating current (Bsin ωt), A.C. source 122, to bias voltage $V_b$, where B represents the magnitude of the applied current, would be sufficient to achieve the desired vibrational motion. Ideally, the vibrational frequencies achieved by the addition of the alternating current would be on the order of 100 KHz, a frequency that is an order of magnitude higher than the toner response capabilities, thereby avoiding any deleterious impacts to image quality due to the applied vibrational energy.

Use of this novel marking technique is enabled by the pyroelectric characteristics of the donor belt. In conjunction the novel uses of the pyroelectric donor member incorporated in the present invention serve to reduce or eliminate the requirements for high voltage power supplies, as well as, charge and transfer corotrons generally found in xerographic printing systems. Furthermore, use of existing thermal print head technology enables more compact and less costly systems while avoiding the high cost of thermally sensitive paper normally associated with such systems. The present invention is therefore particularly well suited for use in facsimile, printing, electronic reprographic and multifunctional (i.e. facsimile, printing, and copying) systems, due to the aforedescribed advantages. Moreover, the present invention may be particularly suitable for use in multicolor printing and reprographics due to the relatively inexpensive cost of additional marking apparatus.

Thus, a method and apparatus is disclosed that facilitates the direct marking of print or copy sheets with a pyroelectrically responsive donor apparatus. The method and apparatus include a pyroelectric member, responsive to localized heating from a thermal stylus, and means for subsequently transferring toner from the surface of the poled pyroelectric member to form an image on the surface of a substrate material, wherein the transfer of toner is facilitated by selectively heating the pyroelectric member.

The present invention has been described in detail with particular reference to a preferred embodiment thereof; however, it should be understood that variations and modifications can be effected within the spirit and scope of the instant invention.

I claim:

1. An electrostatic printing apparatus, comprising:

a pyroelectric member suitable for maintaining a uniform electrostatic charge on a front surface thereof, said charge having a first polarity;

charged development particles held in relative contact with the front surface of the pyroelectric member by said electrostatic charge;

an image receiving substrate for receiving the charged development particles; and an array of thermal elements, said array of thermal elements being selectively driven to heat localized areas of the pyroelectric member, thereby resulting in localized charged areas on the front surface of the pyroelectric member, said localized charged areas being opposite in polarity to the first polarity, said localized opposite charge thereby repelling the charged development particles from the front surface of the pyroelectric member and towards a front surface of the image receiving substrate, thereby producing an image thereon.

2. The electrostatic printing apparatus of claim 1 further comprising:

means, working in conjunction with the repelling of the charged development particles for attracting the repelled development particles to the front surface of the image receiving substrate.

3. The electrostatic printing apparatus of claim 2 wherein the means for attracting charged development particles comprises:

a first electrically conductive member in contact with a rear surface of said pyroelectric member;

a second electrically conductive member disposed near a rear surface of the image receiving substrate; and a bias voltage applied between the first and second electrically conductive members, thereby producing an electric field suitable for attracting the charged development particles towards the front surface of the image receiving substrate.

4. The electrostatic printing apparatus of claim 3 further comprising:

means for fixing the charged development particles to the front surface of the image receiving substrate.

5. The electrostatic printing apparatus of claim 4, wherein the pyroelectric member comprises a permanently poled pyroelectrically responsive layer, and an adjacent electrically conductive layer.

6. The electrostatic printing apparatus of claim 5, wherein the permanently poled pyroelectrically responsive layer is selected from the group consisting of polyvinylidene fluoride and triglycine sulfate.

7. The electrostatic printing apparatus of claim 4 wherein the image receiving substrate is a paper substrate.

8. The electrostatic printing apparatus of claim 1 further comprising:

means for adding energy to the charged development particles, thereby reducing energy required to repel the particles from the front surface of the pyroelectric member.

9. The electrostatic printing apparatus of claim 8 wherein the energy adding means comprises means for acoustically vibrating said poled pyroelectric member, wherein said acoustic vibration introduces energy to the charged development particles which are in contact with the front surface of said pyroelectric member.

10. The electrostatic printing apparatus of claim 8 wherein the poled pyroelectric member is also piezoelectrically responsive and wherein the energy adding means comprises:

an alternating current supply for imparting an alternating current across the pyroelectric member, thereby producing a piezoelectric response within the pyroelectric member, resulting in an introduction of vibrational energy to the charged development particles in contact with the front surface of said pyroelectric member.

11. A method of producing an image on an image receiving substrate in an electrostatic printing apparatus having a poled pyroelectric marking member with a first charge polarity, including the steps of:

a) uniformly covering a first surface of the pyroelectric marking member with electrically charged marking particles, said particles being attracted by said first charge polarity;

b) positioning said first surface of the pyroelectric member in close proximity to the image receiving substrate; and c) locally heating the pyroelectric member to expose selective portions of the member, thereby producing localized regions of opposite charge polarity on the first surface thereof, and repelling some of the charged development particles away from the opposite charge polarity regions towards a surface of the image receiving substrate, resulting in the production of an image on the surface of the image receiving substrate.

12. The method of claim 11, further comprising the steps of:

attracting those charged development particles which are repelled from the surface of the pyroelectric member, to the surface of the image receiving substrate; and fixing the attracted charged development particles to the image receiving substrate in a permanent fashion.

13. The method of claim 12, further comprising the step of:

vibrationally exciting an energy state of the charged development particles in order to enhance a probability of transfer of development particles from the localized regions of opposite charge polarity.

14. An electrostatic printing apparatus, comprising:

a pyroelectric member suitable for maintaining a uniform electrostatic charge having a first charge polarity on a front surface thereof;

charged development particles held in relative contact with the front surface of the pyroelectric member by said electrostatic charge;

an image receiving substrate for receiving the charged development particles; and a plurality of thermal elements disposed in contact with a rear surface of said pyroelectric member, said thermal elements being selectively driven to heat localized areas of the pyroelectric member, thereby resulting in localized charged areas on the front surface of the pyroelectric member, said localized charged areas being of an opposite polarity, wherein the opposite polarity results in a net repelling force suitable for urging the charged development particles towards a surface of the image receiving substrate.

15. The electrostatic printing apparatus of claim 14, wherein the plurality of thermal elements are contained in a thermal print stylus.

16. The electrostatic printing apparatus of claim 14, wherein the plurality of thermal elements are contained within a flexible resistive layer operatively attached to the rear surface of the pyroelectric member.

17. A method of producing a permanent image on an image receiving substrate in an electrostatic printing apparatus having a permanently poled pyroelectric marking member with a surface potential of a first polarity, the method including the steps of:

a) uniformly covering a first surface of the pyroelectric marking member with electrically charged toner particles, said toner particles being attracted thereto by the surface potential of the first polarity;

b) positioning the first surface of the pyroelectric member in close proximity to the image receiving substrate;

c) locally heating the pyroelectric member to thermally expose selective portions of the member, resulting in localized regions of opposite charge polarity on the first surface thereof, thereby repelling some of the charged toner particles away from the opposite polarity regions and towards a surface of the image receiving substrate;

d) vibrationally exciting an energy state of the charged toner particles in order to enhance a probability that the particles over the localized regions of opposite polarity will be repelled from the opposite polarity regions;

e) attracting those charged toner particles repelled from the surface of the pyroelectric member to the surface of the image receiving substrate; and f) fixing those toner particles previously attracted to the image receiving substrate, in a permanent fashion.

* * * * *